US012282503B2

United States Patent
Constantin et al.

(10) Patent No.: US 12,282,503 B2
(45) Date of Patent: Apr. 22, 2025

(54) INLINE SEARCH BASED ON INTENT-DETECTION

(71) Applicant: Microsoft Technology Licensing, LLC, Redmond, WA (US)

(72) Inventors: Thomas Constantin, Seattle, WA (US); Matthew Sledge Epstein, Redmond, WA (US); TszYan C Zogg, Sammamish, WA (US); Lutfi Ilke Kaya, Seattle, WA (US); Christopher Andrews Jung, Seattle, WA (US); Ragavenderan Venkatesan, Mill Creek, WA (US); Ming Wu, Kirkland, WA (US); Zhiguo Yu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 439 days.

(21) Appl. No.: 17/724,001

(22) Filed: Apr. 19, 2022

(65) Prior Publication Data

US 2023/0334073 A1    Oct. 19, 2023

(51) Int. Cl.
*G06F 16/33*    (2019.01)
*G06F 16/332*    (2019.01)
(Continued)

(52) U.S. Cl.
CPC ...... *G06F 16/3334* (2019.01); *G06F 16/3328* (2019.01); *G06F 16/3335* (2019.01); *G06F 40/106* (2020.01)

(58) Field of Classification Search
CPC ............. G06F 16/3334; G06F 16/3328; G06F 16/3335; G06F 40/106
See application file for complete search history.

(56) References Cited

U.S. PATENT DOCUMENTS 9,965,559 B2 *   5/2018   Marcin ............... G06F 16/9538
11,301,777 B1 *  4/2022   Talmor .................... G06F 40/30
(Continued)

FOREIGN PATENT DOCUMENTS

BR    112015030417 B1 *   7/2022    ......... G06F 16/3323
CA        3150535 A1 *    3/2021    ......... G06F 16/2457
(Continued)

OTHER PUBLICATIONS

"International Search Report and Written Opinion Issued in PCT Application No. PCT/US23/012078", Mailed Date: May 3, 2023, 9 Pages.

*Primary Examiner* — Mohammad K Islam

(57) ABSTRACT

Systems and methods are provided for automatically determining an intent of a user based on an intent model to attach a file to a document, prompting the user to confirm the intent using a predetermined character in an inline nudge, generating and displaying an inline menu with an interactive list of ranked files as a suggestion for attachment. The disclosed technology uses the intent for specifying a scope of the inline search. The intent model for attaching content maintained by third-party applications uses a combination of an embeddings model and an N-gram model with limited seed queries and determines the intent based on intent scores associated with respective third-party applications. The present disclosure ranks respective candidate content based on a degree of relevance to the intent. The user selects one or more content from the list for attaching to the document.

20 Claims, 8 Drawing Sheets

(51) Int. Cl.
*G06F 16/3332* (2025.01)
*G06F 40/106* (2020.01)

(56) References Cited

U.S. PATENT DOCUMENTS

| | | | |
|---|---|---|---|
| 11,526,579 B1* | 12/2022 | Shi | G06F 16/986 |
| 11,650,996 B1* | 5/2023 | Daianu | G06N 20/00 |
| | | | 707/771 |
| 11,687,802 B2* | 6/2023 | Subramanya | G10L 15/1815 |
| | | | 704/9 |
| 2014/0289228 A1* | 9/2014 | Mei | G06Q 30/02 |
| | | | 707/722 |
| 2015/0088871 A1* | 3/2015 | Ruotsalo | G06F 16/24578 |
| | | | 707/723 |
| 2015/0127591 A1* | 5/2015 | Gupta | G06Q 50/01 |
| | | | 706/12 |
| 2017/0228461 A1* | 8/2017 | Lev | G06F 40/295 |
| 2020/0143102 A1* | 5/2020 | Ziraknejad | G06F 16/904 |
| 2021/0073293 A1* | 3/2021 | Fenton | H04L 51/08 |
| 2021/0335349 A1* | 10/2021 | Jacobson | G06F 40/30 |
| 2021/0342785 A1* | 11/2021 | Mann | G06F 40/186 |
| 2023/0161944 A1* | 5/2023 | Sharma | G06F 40/109 |
| | | | 715/269 |
| 2023/0214397 A1* | 7/2023 | Park | G06F 16/2358 |
| | | | 707/705 |

FOREIGN PATENT DOCUMENTS

| | | | | |
|---|---|---|---|---|
| WO | WO-2015153310 A1 * | 10/2015 | | G06F 16/90332 |
| WO | 2017059388 A1 | 4/2017 | | |

* cited by examiner

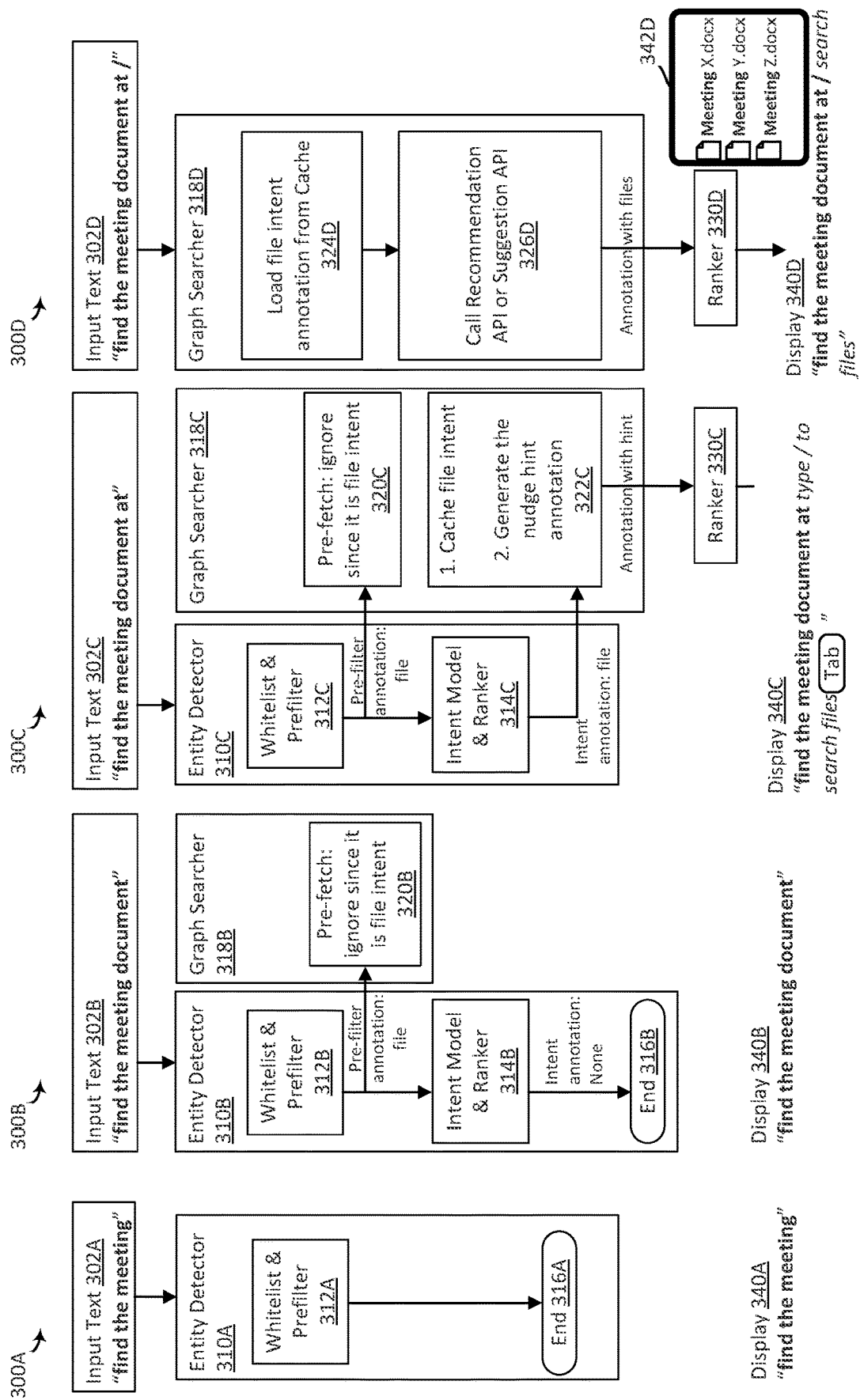

INLINE SEARCH BASED ON INTENT-DETECTION

BACKGROUND

Inline menus for interactively assisting a user to create a document have become widely available as a part of the user experience. As a user creates a document (e.g., emails and messages) by entering characters and words, there may be a situation where the user wishes to insert or attach a file or other content to the text. The user may enter a predetermined anchor (e.g., '/', '@,' and the like), which may cause a system to display a list of files and/or content for attachment. The list may be based on recent files, for instance. If the desired file is on the list, the user may select the file and/or content from the list to attach to the text.

For systems that rely on user input, issues may arise because a user must often interrupt a train of thought entering text to instead enter a predetermined anchor and look for a file or content to insert. Since entering text and searching for a file in storage are distinct operational tasks for the user, the user may often lose concentration when typing the text, resulting in reduced productivity and frustration for the user. Additional issues that may interrupt the user's train of thought may also arise when the presented list of files does not include files relevant to the user's intent. Still more issues arise if the desired file or content is from a third-party application, which may have different login information and a distinct graphical user interface. Accordingly, there arises a tension between maintaining focus while entering text and the convenience of attaching a file to a document using an inline search menu.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for automatically determining a user intent and generating an inline search menu based on the determined intent. In particular, the present disclosure determines a user intent to attach content as the user enters data (e.g., types texts) into an application. Based on the determined intent, the present disclosure automatically generates and displays a notification and/or an interactive list of ranked files as suggestions for attachment to a document. The disclosed technology automatically determines user intent while the user is in an input loop in a document. The disclosed technology further generates and displays a list of ranked files based on the determined intent to interactively select a file for attachment to the document.

As an example, the term an "input loop" herein refers to a cycle of a user interactively entering data into an application or document. The means for entering text includes but is not limited to receiving characters through a key input device (e.g., a keyboard), receiving input on a touch screen of a device, selecting data for input by a pointing device, capturing image data via a camera and interpreting the image data as input (e.g., using image recognition software), or receiving spoken voice data via a microphone and interpreting the voice data as input (e.g., speech-to-text). An example of an input loop includes a user iteratively typing letters using a keyboard to enter words, sentences, and text to create a document. While the user is focused on entering text during an input loop, the user often wishes to insert image data, attach a file, or other content to the document.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system for generating an inline search menu based on intent in accordance with aspects of the present disclosure.

FIGS. 2A-B illustrate example intent models in accordance with aspects of the present disclosure.

FIGS. 3A-D illustrate example systems for determining intent and generating an inline search menu in accordance with aspects of the present disclosure.

FIGS. 4A-B illustrate examples of user interface in accordance with aspects of the present disclosure.

DETAILED DESCRIPTION

Figure 1:
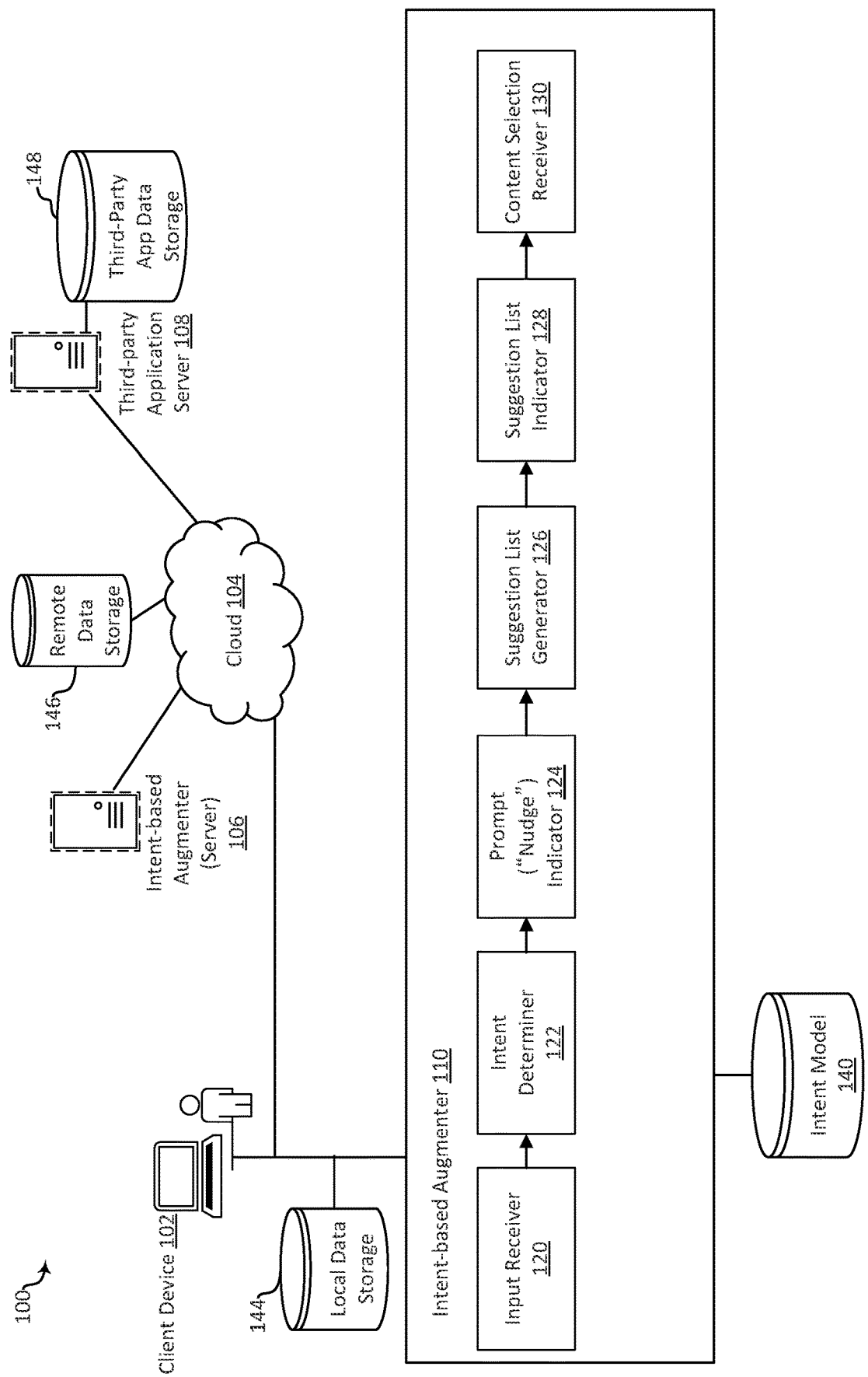

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Features such as automatically completing remaining letters of words and phrases while a user types are popular because the features enable users to continue typing without interrupting a stream of thought when pausing to think about a correct spelling of a word. There have been additional features such as an inline search menu. The inline search menu appears when a user inputs a predetermined letter or letters (e.g., 'A' or '#') as the user types a sentence. The user may enter the predetermined letter when the user wishes to attach, insert, or paste some data to the content the user is creating. The inline search menu includes a feature to search for and select stored files or data (e.g., image data) to be attached, inserted, or pasted to the content being created by the user. The inline search menu enables the user to search for, find, select, and attach data to the content without opening a new application for selecting the data. However, while the inline search menu appears to be simple and convenient, suspending typing to interact with the search menu to find and insert content still interrupts the user's train of thought.

As discussed in more detail below, the present disclosure is directed to automatically generating and interactively providing a prompt and an inline search menu for selecting a file of content for attachment. The disclosed technology uses a combination of an entity model and a task model (e.g., a graph model) to detect and determine a user intent to attach an entity (e.g., a file) to the document while the user is in an input loop. A system according to the present disclosure displays a prompt or a nudge to the user in response to determining a user intent to attach a file. The system automatically defines a scope of an inline search menu based on the determined intent and generates a list of ranked files for suggested attachment using a task model (e.g., a graph model). The files are ranked according to a level of relevance to the determined intent. Additionally or alternatively, the disclosed technology uses a combination of an embeddings model and an N-gram model to determine a likelihood of a third-party application being relevant to include in the scope of the inline search. The use of the N-gram model in conjunction with the embeddings model enables the system to address a lack of training data to train the embeddings model to predict a third-party application with a sufficient level of accuracy. By automatically determining the user intent to attach a file based on the context of an input loop and causing display of a transient inline prompt for attaching a file, interruption of the input loop is minimized while also enabling seamless inline attachment of a relevant file based on the determined user intent. In this way, the disclosed technology enables the user to attach a relevant file while continuing to create a document without navigating away to manually search for the file, thereby minimizing interruptions while facilitating seamless inline attachment of a relevant file during an input loop.

The disclosed technology includes receiving user input (e.g., typing letters in an input loop), determining a user intent using an intent model, displaying a nudge (e.g., a prompt), generating a ranked suggestion list of attachment content based on relevance to the determined intent, and displaying the ranked suggestion list for selection. In aspects, the intent model includes two types: a first-party intent model for content accessible by a first-party application (i.e., content with strong entity types) and a third-party intent model for content maintained by third party applications. In aspects, the third-party intent model is configured to address the limited amount of training data available while also attaining an acceptable level of accuracy in determining user intent.

FIG. 1 illustrates an overview of an example system for determining intent and generating an inline search menu in accordance with aspects of the present disclosure. The system 100 includes a client device 102 with an intent-based augmenter (client) 110, a cloud 104, an intent-based augmenter (server) 106, a third-party application server 108 with a third-party application data storage 148, an intent model 140, a local data storage 144, and a remote data storage 146.

The client device 102 interacts with a user who creates a document by entering data (e.g., interactively in an input loop). For example, the user may use a keyboard and enter letters to create a text. The system 100 may store documents in a variety of data storages including a local data storage 144 attached locally to the client device 102 and a remote data storage 146 in the cloud 104.

Intent-based augmenter (client) 110 augments a document being created by the user by automatically generating and presenting a list of content (e.g., files) based on a determined user intent for selection by the user. The intent-based augmenter (client) 110 provides the selected content for inserting and/or attaching into the document.

In an example, the intent-based augmenter (client) 110 automatically determines a user intent during an input loop, e.g., while the user is entering data to create a document. Based on the determined intent, the intent-based augmenter (client) 110 may interactively prompt the user by indicating that a suggestion list of content is available for the user to select for insertion or attachment to the document. In aspects, the suggestion list may include a list of ranked content based on a degree of relevance to the determined intent.

In aspects, the suggestion list may include different types of content (e.g., different types of files or different files of the same file type) stored in the local data storage 144, in the remote data storage 146, and/or in a third-party application data storage 148. In some aspects, the suggestion list may include content that appears to be seamlessly retrievable, whether the content is stored in the local data storage 144, in the remote data storage 146, or in the third-party application data storage 148.

The intent-based augmenter (client) 110 includes an input receiver 120, an intent determiner 122, a prompt ("nudge") indicator 124, a suggestion list generator 126, a suggestion list indicator 128, a content selection receiver 130. The intent-based augmenter (client) 110 may use an intent model 140.

The input receiver 120 receives input data entered by the user using the client device 102. In an example, the user iteratively enters characters in an input loop, creating a document. The input receiver 120 sends the received letters to the intent determiner 122. In aspects, the sending of the received letters may be one character at a time. In some other aspects, the sending of the received letters may be a plurality of characters at a time. In aspects, the document may include an email, a memo, and the like.

The intent determiner 122 determines a user intent while the user is entering input data based on a set of letters (e.g., a string of characters) entered. In aspects, the intent determiner 122 uses an intent model (i.e., a combination of the first-party intent model and the third-party model) that is trained to predict a likelihood of a user intent to attach content based on the set of letters. In an example, training data for the intent model may include ground truth example words pairs with a user intent to attach content associated with the words.

An issue arises in training the intent model 140 when an amount of training data is insufficient. The issue may be prevalent for content maintained by third-party applications because entities associated with usage patterns may be unavailable for offline training of the intent model 140. For the first-party intent model, examples of entities available for offline training may include file links, an URL (Universal Resource Locator), a phone number, an address, a contact name, a personal identification number (e.g., a membership number), a calendar availability, date/times, and the like. In contrast, for the third-party intent model associated with third-party applications, examples of the entities unavailable for offline training may include federated content stored in data storages across a network and managed by a third-party application, connector data, and/or data dynamically created by a third-party application.

As detailed below, the disclosed technology may include distinct methods to determine a user intent to attach content and to rank and generate a suggestion list, which may be based on whether content or references to specific content are strongly typed entities. A first is "what" entities (e.g., files) are going to be served to the user. A second is "how" the entities are going to be served to the user. In an example, content of the entities may be stored in local and/or remote data storages that are accessible by a uniform method (e.g., accessing files stored in data storage that are locally and/or remotely mounted). In another example, the entities may be stored and maintained by a third-party application. Some third-party applications may necessitate log-in operations to authenticate credentials and/or a use of custom API for dynamically generating each document on-demand for export.

In an example, a third-party application server 108 maintains files stored in the third-party application data storage 148. The present disclosure may encompass suggested attachment content including files associated with first-party applications (whether locally or remotely stored) and/or files maintained by third-party applications. In this way, whether the desired files are associated with first-party or third-party applications, the user may select and attach the desired files in a seamless manner to augment the document being created.

The intent determiner 122 determines a user intent to attach content based on input text data while the user is in an input loop creating a document. The intent determiner 122 outputs whether the user intends to attach an entity of some type. For example, the system may first determine a type of filed to attach (e.g., an image file, a document file, a video file, a URL, etc.) and then determine candidate documents of the file type for attachment. For instance, the system may determine a user intent to attach a picture (e.g., image file) and then prompt the user to determine specific image files for attachment. Alternatively, if the system determines a user intent to attach content but cannot limit the search to a file type, the system may continue receiving additional input text data or determine suggested content for attachment from multiple different file types. The intent determiner 122 further determines whether the user intends to attach content maintained by a third-party application and identifies the third-party application from which the user most likely intends to retrieve and attach content. When the intent determiner 112 determines a user intent to attach content (e.g., a file) to a document, the disclosed technology displays a prompt (e.g., a nudge), retrieves and ranks content based on relevance to the intent, and generates a suggestion list. When the intent determiner 112 determines that there is no intent for attaching an entity based on the input text, the intent determiner 112 outputs "no intent" and waits for further text input from the input receiver 120.

As detailed below, the intent determiner 122 may include a prefilter, a third-party intent detection model, and a ranker. The prefilter determines intent for annotating a particular entity type based on a whitelist. The third-party intent detection model predicts a third-party application intent based on a query.

The prompt ("nudge") indicator 124 provides an indication that a suggestion list of content for attachment is available to the user. In an example, the prompt ("nudge") indicator 124 causes the client device to display a transient indicator or "nudge" (e.g., an icon or a predetermined character '@', '#', '/,' and the like) at a location following the current text input (e.g., a location following a text input cursor) in the input loop to suggest attaching content. A prompt is not limited to a character but may be a symbol, an icon, an image, a visual marker, or the like. For example, the input text line with the nudge may indicate "find the meeting document at type/to search files," where a character 'I' may represent a predetermined character for triggering a search for attachment files. The prompt ("nudge") indicator 124 waits for interactive user input (e.g., entering or selecting the predetermined character to confirm the user's acknowledgement to search for a file for attachment) or expiration of a period of time. When no user input is received within the period of time, display of the prompt indicator 124 may be discontinued to avoid cluttering the document and causing a potential distraction from an input loop.

The suggestion list generator 126 generates a suggestion list. The suggestion list includes a list of ranked content (e.g., files) based on relevance of the respective content to the determined user intent. Based on the determined user intent to attach content, the suggestion list generator 126 determines candidate content to attach to the document based on relevance to the intent to attach. In aspects, the suggestion list generator 126 retrieves content based on a determined scope of search, rank the respective content based on relevance to the user intent to attach, and generates the suggestion list with the ranked content. In an example, content with higher relevance to the determined intent is positioned higher in the suggestion list. The suggestion list generator 126 may access the local data storage 144, the remote data storage 146, and/or the third-party application data storage 148 via the third-party application server 108 and retrieves files that are relevant to the determined a user intent to attach content. The disclosed technology generates the suggestion list lists content that are relevant to what the user intends to attach more accessible based on the ranking. The suggestion list enables the user to see and select content that match with the user intent for attachment with less time, thereby improving productivity and efficiency of user in creating the document.

When the prompt ("nudge") indicator 124 receives the predetermined character (e.g., '/') and confirms the user's acknowledgement to search for files, the suggestion list indicator 128 indicates or displays the suggestion list, causing the client device 102 to display the suggestion list on the client device 102. In an example, the suggest list includes a list of content (e.g., files) that are ranked based on relevance to the user intent to attach content.

The content selection receiver 130 receives a selection of content (e.g., a file) for attachment. In aspects, the user using the client device 102 responds to the suggestion list that is displayed on the client device 102 by selecting a suggestion (e.g., a file) for attaching to the document being created. The content selection receiver 130 receives the selection and retrieves the content from a storage (e.g., the local data storage 144, the remote data storage 146, and/or the third-party application data storage 148).

The third-party application server 108 maintains and serves content (e.g., files) stored in the third-party application data storage 148. In an example, the third-party application server provides an application programming interface (API) (e.g., Recommendation API or Suggestion API) to enable the intent-based augmenter 110 to access and retrieve files from the third-party application data storage 148.

Additionally, or alternatively, the intent-based augmenter (client) 110 may be associated with an intent-based augmenter (server) 106 connected to the cloud 104. In aspects, the intent-based augmenter (server) 106 determines a user intent to attach content using respective client devices including the client device 102, provides the nudge, generates suggestion lists, and providing the suggestion lists by performing a series of steps that are substantially similar to the intent-based augmenter 110.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figures 2A, 2B:
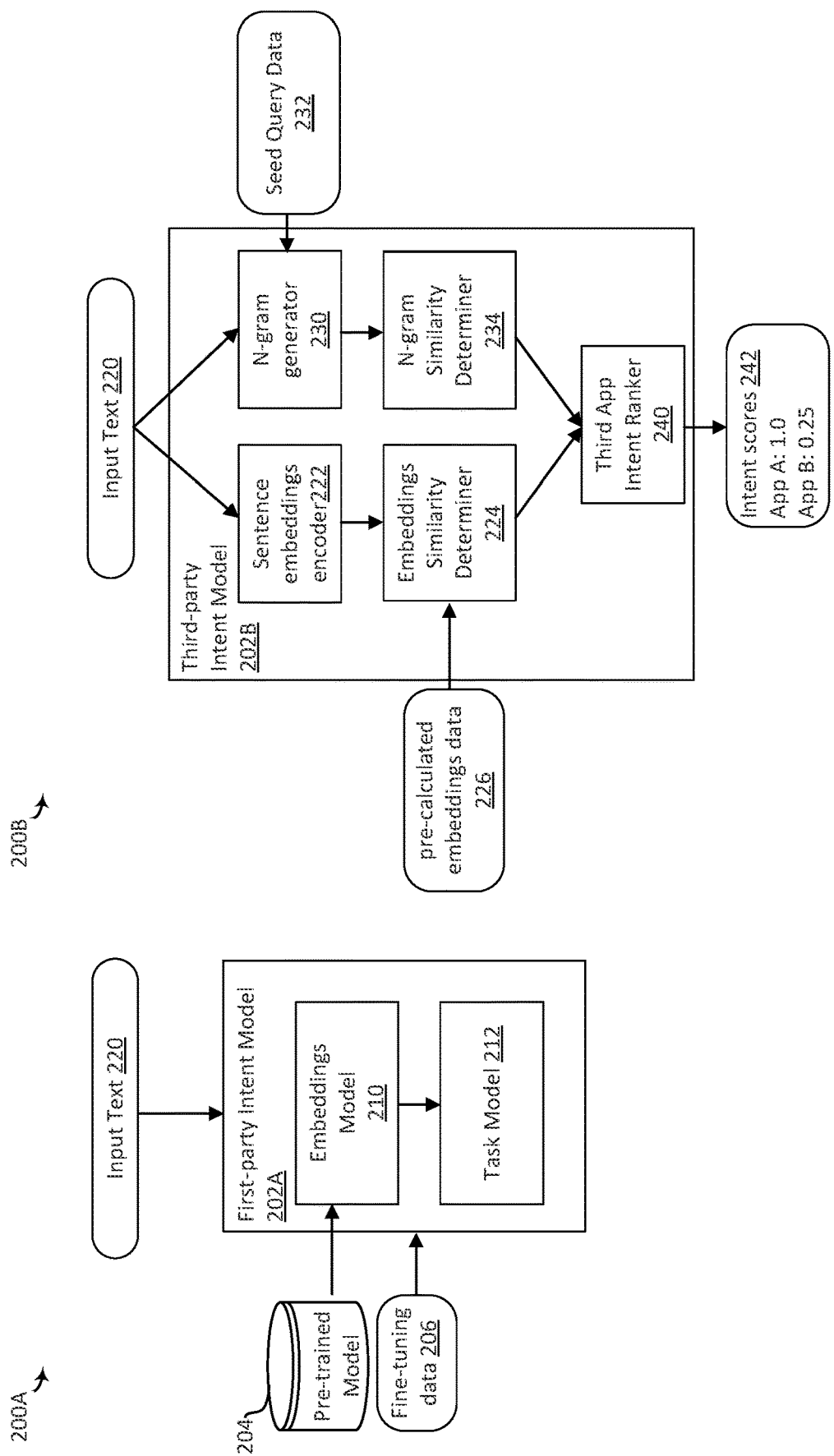

FIGS. 2A-B illustrate example intent models according to aspects of the present disclosure. The example intent models include a first-party intent model and a third-party intent model. Both intent models respectively serve two purposes: user intent detection and graph entity suggestions. Both intent models detect intent to attach and determines specific entity types (e.g., file type) for attachment according to the current context of input by the user. Graph entity suggestion generates a list of items of an entity type (e.g., files) from a set of entities in a graph as the user engages in searching for an entity to attach to a document being composed. An output from the user intent detection effectively narrows a scope of search in the graph and thus improve a performance of generating a list of ranked entities as a suggestion for the user to attach to the document. Distinct types of the intent models (e.g., the first-party intent model and the third-party intent model) may be used to perform intent detection based on whether entities are strongly typed. For example, entities may be strongly typed when the entities are stored in local and/or remote data storages that are mounted and are uniformly accessible as a particular entity type (e.g., files). In another example, entities may not be strongly typed when content are stored and maintained by a third-party application.

FIG. 2A illustrates an example of a first-party intent model for determining a user intent to attach content based on content that are strongly typed entities (e.g., a file as an entity type). For example, content stored in local and/or remote file storages and web pages are associated with a strongly typed entity of a file or a web link (e.g., Universal Resource Locator (URL)) with a known data format. In general, strongly typed entities may be readily available as training data to train the first-party intent model.

The first-party intent model 202A includes an input text 220, an embeddings model 210 and a task model 212. The embeddings model 210 may be pre-trained by training data in a pre-trained model 204. The embeddings model 210 determines an entity type based on the input text 220 received from the input receiver (e.g., the input receiver 120 as shown in FIG. 1). Embeddings represent a multi-dimensional vector form of words and sentences in the input text and characterizes features of the input text. In aspects, the embeddings model 210 estimates an entity type (e.g., a file) based on the embeddings of the input text. When the embeddings model 210 determines an entity type as a user intent to attach content according to the embeddings of the input text, the task model 212 retrieves content according to the entity type, ranks the content according to relevance to the intent, and generates a list of suggestions for attachment. The embeddings model 210 may be based on a large-scale language model where embeddings are used as features to improve intent detection.

In aspects, the task model 212 includes a graph entity model for searching for one or more entities (e.g., files) in a graph structure. In some aspects, the graph structure may include connectors and links to third-party applications by using application programming interface (API). The graph entity model may further include a link to a calendar application to identify entities representing an event, availability of participants to the event, and the like.

FIG. 2B illustrates an example of a third-party intent model for detecting and determining a user intent to attach content when content is maintained by third-party applications according to aspects of the invention. A third-party intent model 202B receives an input text 220 entered by the user during an input loop and determines a user intent to attach content and a type of a third-party application. In an example, the third-party intent model 202B includes a combination of two processes in parallel. A first path determines a user intent to attach content based on embeddings of the input text 220. A second path determines a user intent to attach content based on a contiguous sequence of words in the input text 220.

In contrast to files stored in local and remote file storages, content maintained by a third-party application may include entities that are not strongly typed. In examples, third-party applications may make content available through application programming interface (API) that is unique to the third-party applications. Some third-party applications do not store content as files in third-party application data storage but may dynamically generate files based on a request from a client application. Furthermore, a quantity of training data available for training the intent model may be limited when an entity is not strongly typed. For example, a link that was used to retrieve a spreadsheet based on data that are dynamically generated by third-party applications may not be reusable. The content does not necessarily persist in a third-party application data storage.

In aspects, the third-party intent model 202B includes a sentence embeddings encoder 222 and an embeddings similarity determiner 224 as the first path. The sentence embeddings encoder 222 encodes the input text 220 and generates embeddings of the input text 220. The embeddings similarity determiner 224 determines a degree of similarity between the encoded sentence (i.e., the embeddings) and pre-calculated embeddings data 226. The pre-calculated embeddings data 226 includes sample embeddings that corresponding to a combination of an intent and a third-party application that maintains content for attachment. For example, the sentence embeddings encoder 222 may include but limited to a transformer model with a Siamese network structure that is fine-tuned by use of sentence-pair regression tasks. The transformer model may use mean pooling.

The third-party intent model 202B further includes an N-gram generator 230 and an N-gram similarity determiner 234. The N-gram generator 230 generates N-grams based on the received input text 220. In aspects, the N-gram generator 230 uses seed query data 232 as examples of text phrases that associate text to an intent. The seed query data 232 includes a set of text phrases entered by the user in previous use of content maintained by third-party applications for attachment. As ground-truth examples, respective text phrases correspond to the user intent to attach content by accessing third-party applications. Examples of the seed query data 232 include but not limited to "here is the article on" and "refer to this ABC article," which correspond to a third-party application called "ABC" that maintains and provides articles. Other examples of seed query data may include text phrases "can you follow up with this lead" and "the customer escalated this case," which correspond to a third-party application when there is the third-party application that manages and provides sales and customer relationship data. Although a number of samples may be limited to train an intent model, use of the seed query data 232 as samples to generate an N-gram from the input text 220 may help correlate the input text 220 with a third-party application with a degree of accuracy that is sufficient to determine a user intent to attach content.

The N-gram similarity determiner 234 determines a degree of similarity between the N-gram of the input text 220 and sample data and identifies a third-party application. The third-party application intent ranker 240 ranks respective third-party applications based on a combination of a third-party application determined based on the embeddings and based on the N-gram of the input text 220. In aspects, the third-party application intent ranker 240 generates a list of intent scores 242 based on a semantic similarity to detect the closest intent and entity type. Each intent score represents a confidence score associated with a third-party application. For example, the intent scores 242 indicates a score of 1.0 for a third-party application called "App A" and a score of 0.25 for another third-party application called "App B." the set of intent scores indicate that the third-party intent model 202B has determined an intent to attach content more likely maintained by "App A" than another content maintained by "App B." Accordingly, the system automatically determines a user intent to attach content and a scope of inline search for content for attachment during an input loop.

As will be appreciated, the various methods, devices, applications, features, etc., described with respect to FIGS. 2A-B are not intended to limit the systems 200A-B to being performed by the particular applications and features described. Accordingly, additional controller configurations may be used to practice the methods and systems herein and/or features and applications described may be excluded without departing from the methods and systems disclosed herein.

FIGS. 3A-D illustrates example systems in accordance with aspects of the present disclosure. In particular, FIGS. 3A-D describes how the systems determines a user intent to attach content based on iteratively receiving input text, prompts the user for displaying a suggestion list, and generates an inline list of suggestions including ranked files for selection. FIG. 3A illustrates an example of a system 300A where the system determines no intent to attach a file during an input loop. In an example, the user enters an input text 302A "find the meeting" during an input loop to create a document. The input text 302A "find the meeting" is a part of a sentence where the system determines that there is no intent by the user to attach a file.

In aspects, an entity detector 310A includes a whitelist & prefilter 312A. The whitelist & prefilter 312A prefilters the input text 302A and determine whether there is a likely intent using a whitelist. The whitelist (not shown) includes a list of text phrases that either identifies an intent or does not identify an intent to attach a file. In aspects, the whitelist & prefilter 312A does not identify an intent to attach a file. As such, an end operation 316A ends the determining the user intent to attach content and waits for a subsequent input text. A display 340A displays the input text 302A without a nudge "find the meeting."

FIG. 3B illustrates an example system 300B where a whitelist & prefilter 312B in an entity detector 310B prefilters an intent that the user intends to attach a file. In an example, an input text 302B indicates a phrase "find the meeting document." The user continues to enter text by an additional word, "document." The whitelist & prefilter 312B prefilters the input text 302B and determines an intent to attach an entity with an entity type "file."

In aspects, use of the additional word, "document," in the input text 302B triggers identifying an intent to attach a file. A graph searcher 318B ignores the prefiltered intent of a file type (320B) because the input text 302B does not include a word (e.g., "at") that is likely a first word for describing a location of the file. An intent model & ranker 314B determines not to set a scope of an inline search for files because the input text 302B does not include a word (e.g., "at," "in," "stored," and the like) that triggers describing a location of files. As such, an end operation 316B ends determining an intent. A display 340B displays the input text 302A without a nudge "find the meeting document."

FIG. 3C illustrates an example system 300C where a whitelist & prefilter 312C prefilters a likely intent to attach an entity in an entity type "file" based on an input text 302C. In an example, the input text 302C further includes an additional word "at" which represents a first word to start describing a location of a file. The input text 302C indicates "find the meeting document at." The entity detector 310A provides the prefiltered entity type "file" to a graph searcher 318C. The graph searcher 318C ignores and does not proceed to prefetch candidate files for generating a list of suggestions (320C). An intent model & ranker 314C determines, based on the use of "at" in the input text 302C, a user intent to attach an entity (i.e., content) of a type "file" to a document. The graph searcher 318C caches (322C) the determined intent "file" and generates a nudge as a hint annotation to the user. A ranker 330C passes through the nudge annotation. Accordingly, a display 340C displays a text phrase from the input text 302C and appends "at/to search files<TAB>" Thus, the display 340C displays a phrase" find the meeting document at type/to search files<TAB>." Accordingly, the system displays a nudge as reminder when the system determines a user intent to attach a file to a document during an input loop. The user may continue the input loop by entering additional words. Alternatively, as detailed below, the user may enter a character '/' (or enter a Tab key), causing to display an inline list of suggestions of files for attachment.

FIG. 3D illustrates an example of a system 300D that determines a user intent to attach content, generates, and displays an inline list of ranked files as a suggestion for attachment according to aspects of the present invention. In an example, an input text 302D indicates "find the meeting document at I" which includes the predetermined character '/' in response to the nudge in the input text 302D. A graph searcher 318D generates a set of files and/or information associated with candidate files by searching for files according to a search scope determined by the intent. In aspects, the graph searcher 318D loads file intent annotation from the cache 324D (e.g., cached by the graph searcher 318C as shown in FIG. 3C). The graph searcher 318D generates a set of files and/or information associated with candidate files by invoking or calling a recommendation API or suggestion API, which returns the list of candidate files based on the determined a user intent to attach content. A ranker 330D generates a list of ranked files 342D by ranking respective files based on degrees of relevance to the user intent to attach content. In an example, the input text 302D recites "the meeting document at /." Accordingly, files with names that include "meeting document" have a higher degree of relevance to the intent by the user to search for and attach to the document. As such, the list of ranked files 342D includes the following files: "Meeting X.docx," Meeting Y.docx," and "Meeting Z.docx." Display 340D interactively displays the list of ranked files 342D as an inline menu for the user to select a file for attachment. For an improved usability, the word "Meeting" in the respective file names may be highlighted to indicate relevance of the ranked files to at least a part of the phrase in the input text 302D.

The present technology addresses an issue of interactive inline search menu based on detected user intent to attach files while the user is in an input loop by various performance optimizations. The performance optimizations may include but not limited to pre-filtering (e.g., the whitelist & prefilter 312A-C as shown FIG. 3) the input text to determine whether to invoke the intent model (e.g., the first-party intent model and the third-party model) by using a lightweight processing instruction. Additional optimizations may include a hybrid of client-side and server-side processing where the client device (e.g., the client device 102 as shown in FIG. 1) performs the pre-filtering and at least a subset of the intent model (e.g., the first-party intent model and the third-party model) to detect a user intent to attach content while a server (e.g., the intent-based augmenter (server) 106 as shown in FIG. 1) performs heavier models. For example, the client device may perform a graph entity intent inference while the server may perform intent detections on the server, thereby reducing a network traffic between the client device and the server while the user is in the input loop.

Additional optimizations for performance improvement may include use of a supervised modeling approaches in detecting intent for strong typed entities (e.g., entities with explicit usage patterns (e.g., files, phone numbers, addresses, and the like)). Generic fallback to intent detection for accessing third-party applications leverages weak supervised modeling and similarity-based approaches to scale across all entity types. A use of seed query data addresses an issue of a lack of sufficient training data in determining a third-party application. Tenant entities associated with third-party applications may be stored in a constrained index that provides online entity signals or generates weak annotated data for modeling intent to use the third-party application.

Figures 4A, 4B:
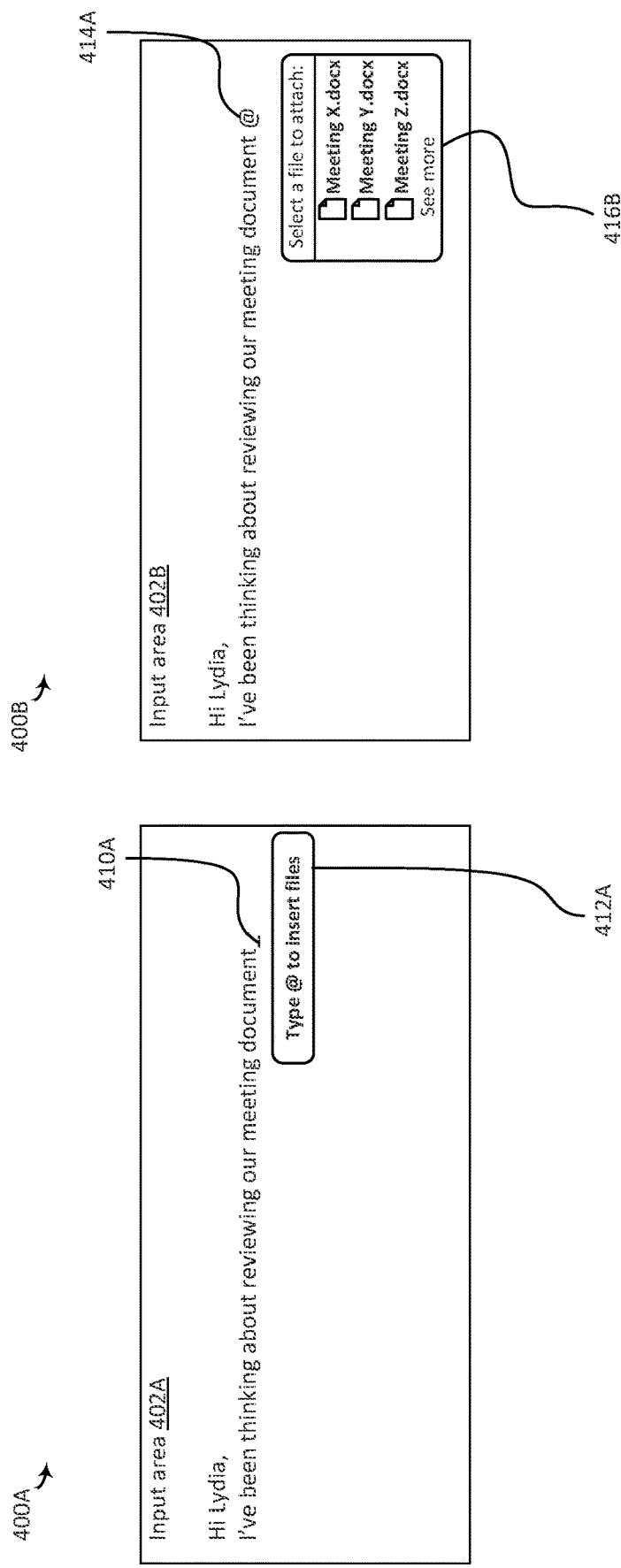

FIGS. 4A-B illustrate examples of graphical user interface (GUI) according to aspects of the present disclosure. FIG. 4A illustrates an example GUI 400A with an input area 402A, displaying an authoring window to interactively create a document. In the example GUI 400A, there is a text, "Hi Lydia, I have been thinking about reviewing our meeting document" as the user is in an input loop. In proximity to the cursor 410A, a nudge 412 is shown. The nudge indicates "Type @ to insert files." The nudge reminds the user that the system has automatically detected and determined a user intent to attach content based on the input text that has been entered by the user in the input area 402A. Here, the system has provided options to the user to either continue entering texts to continue with completing the current sentence or type a predetermined character '@' to search for and insert files to the document.

FIG. 4B illustrates an example GUI 400B with an input area 402B, displaying the authoring window to interactively create the document. In the example GUI 400B, the user has entered the predetermined character '@' after the text "Hi Lydia, I've been thinking about reviewing our meeting document" because the user intends to attach a file to the document. The system displays an inline menu with ranked files as a suggestion for attachment, ranked based on a degree of relevance of the file (e.g., a file name and content of the file) to the user intent to attach content as determined from the input text. In an example, the inline menu with ranked files 416B shows names of three files: "MeetingX.docx," "MeetingY.docx," and "Meeting Z.docx." The file names are sorted based on a degree of relevance of each file to the user intent to attach content. In aspects, the inline menu with ranked files 416B displays a "See more" text for the user to interactively select to display additional candidate files for attachment. In aspects, the user selects a file (e.g., Meeting X.docx"). The system then retrieves content of the selected file and attach the file to the document being created.

Figure 5:
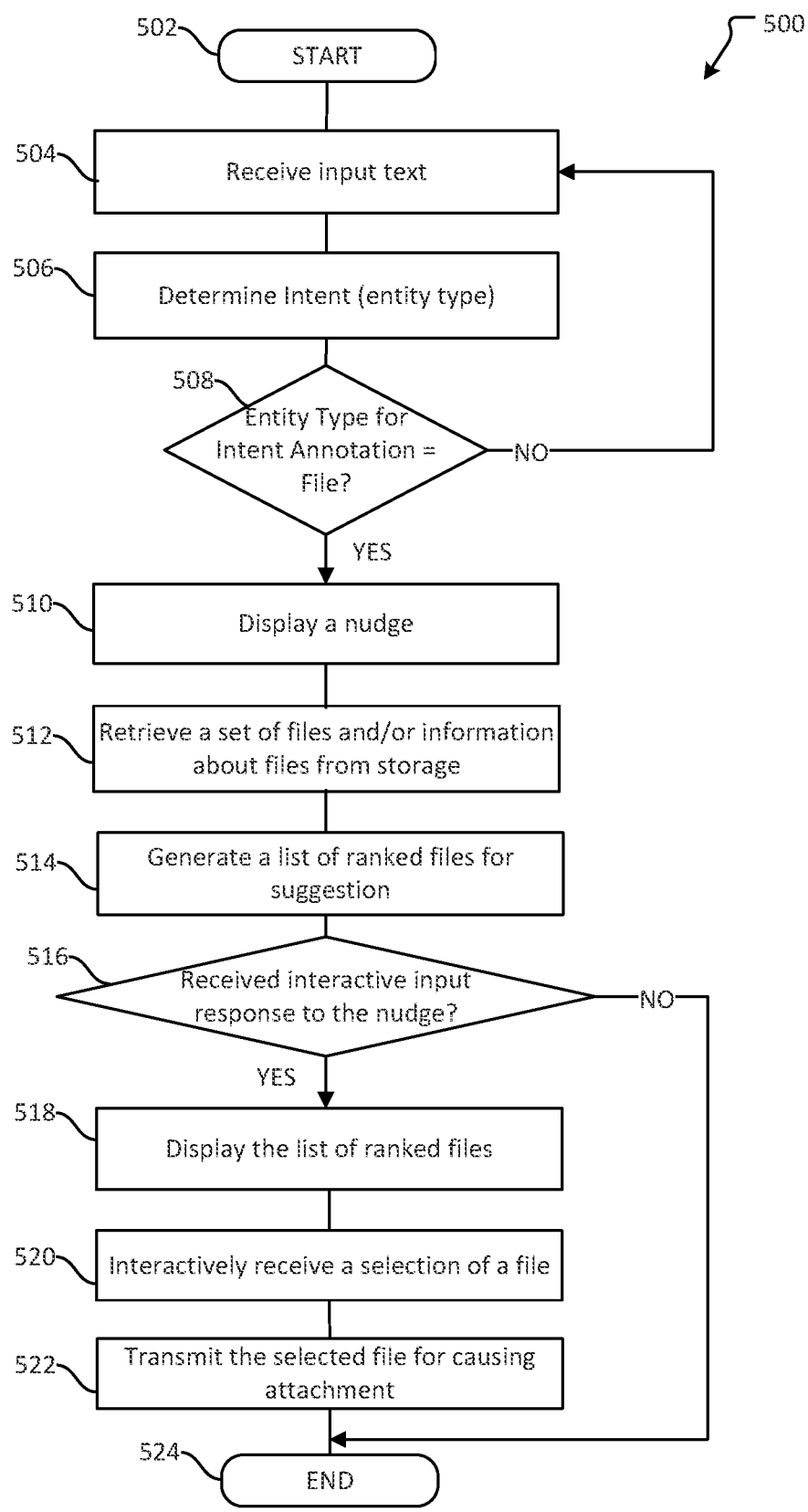
FIG. 5 illustrates an example of a method for determining intent and generating an inline search menu in accordance with aspects of the present disclosure.

FIG. 5 illustrates an example of a method for automatically determining a user intent to attach content, generates and displays a nudge to the user, and generates and displays a list of ranked files for selection according to the aspects of the present disclosure. A general order of the operations for the method 500 is shown in FIG. 5. Generally, the method 500 begins with start operation 502 and ends with end operation 524. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2A-B, 3A-D, 4A-B, 6, 7, and 8A-B.

Following start operation 502, the method 500 begins with a receive input text operation 504, which iteratively receives input text as entered by the user in an input loop to author a document. In aspects, receive input text operation 504 may receive input text a character at a time as the user enters characters using a keyboard. In some other aspects, the receive input text operation 504 may receive text input based on a character that is selected by other input devices (e.g., a mouse).

Determiner intent operation (entity type) 506 determines an intent annotation of the user to attach an entity to a document. In aspects, the determine intent operation 506 uses an intent model (e.g., the first-party intent model 202A as shown in FIG. 2A and the third-party intent model 202B as shown in FIG. 2B.

When an entity type for intent annotation is "file" (i.e., the system has determined that the user has an intent to attach a file), the method 500 proceeds to a display operation 510. When the entity type for intent annotation is not "file," the method proceeds to the receive input text operation 504 and wait for a next input text. When the entity type for intent annotation is determined as "file," the method 500 proceeds to a display operation 510 for displaying a nudge.

The display operation 510 displays a nudge. For example, the nudge may append an instruction to type a predetermined character (e.g., '@', '/', and the like) to the input text. The display operation 510 may display a text "Type @ to insert files" (e.g., the nudge 412A as shown in FIG. 4A).

Receive a set of files operation 512 receives a set of files and/or information about files from storage (e.g., a local data storage 144, a remote data storage 146, and/or a third-party application data storage 148 as shown in FIG. 1). A scope of the inline search is determined based on an intent as detected from the input text. The information about files may include file names.

Generate operation 514 generates a list of ranked files as suggestion for attachment. In aspects, the generate operation 514 retrieves a set of information associated with files that are relevant to the determined the user intent to attach content. The generate operation 514 further ranks the information associated with the respective files based on a degree of relevance of each file to the determined intent. For example, the degree of relevance may be based on a file name of candidate files.

When the system receives 516 the predetermined character (e.g., '/') through an interactive input from the user, the method 500 proceeds to display the list operation 518 that displays the list of ranked files according to the degree of relevance to the user intent to attach content. When the system does not receive the predetermined character (e.g., '/') in response to the nudge, the method 500 proceeds to the end operation 524. When the received interactive input to the nudge occurs with the predetermined character, the method proceeds to display the list operation 518. The display the list operation 518 displays an inline menu that includes a list of ranked files. For example, the files may be sorted in a descending order of relevance to the determined intent. In aspects, the display the list operation 518 may stop displaying the nudge in exchange for displaying the list of ranked files as suggestion.

Interactive receive operation 520 interactively receives a selection of one or more files from the inline menu for attachment. Transmit operation 522 transmits the selected file for causing attachment to the document being authored. The method 500 ends with the end operation 524.

As should be appreciated, operations 502-524 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
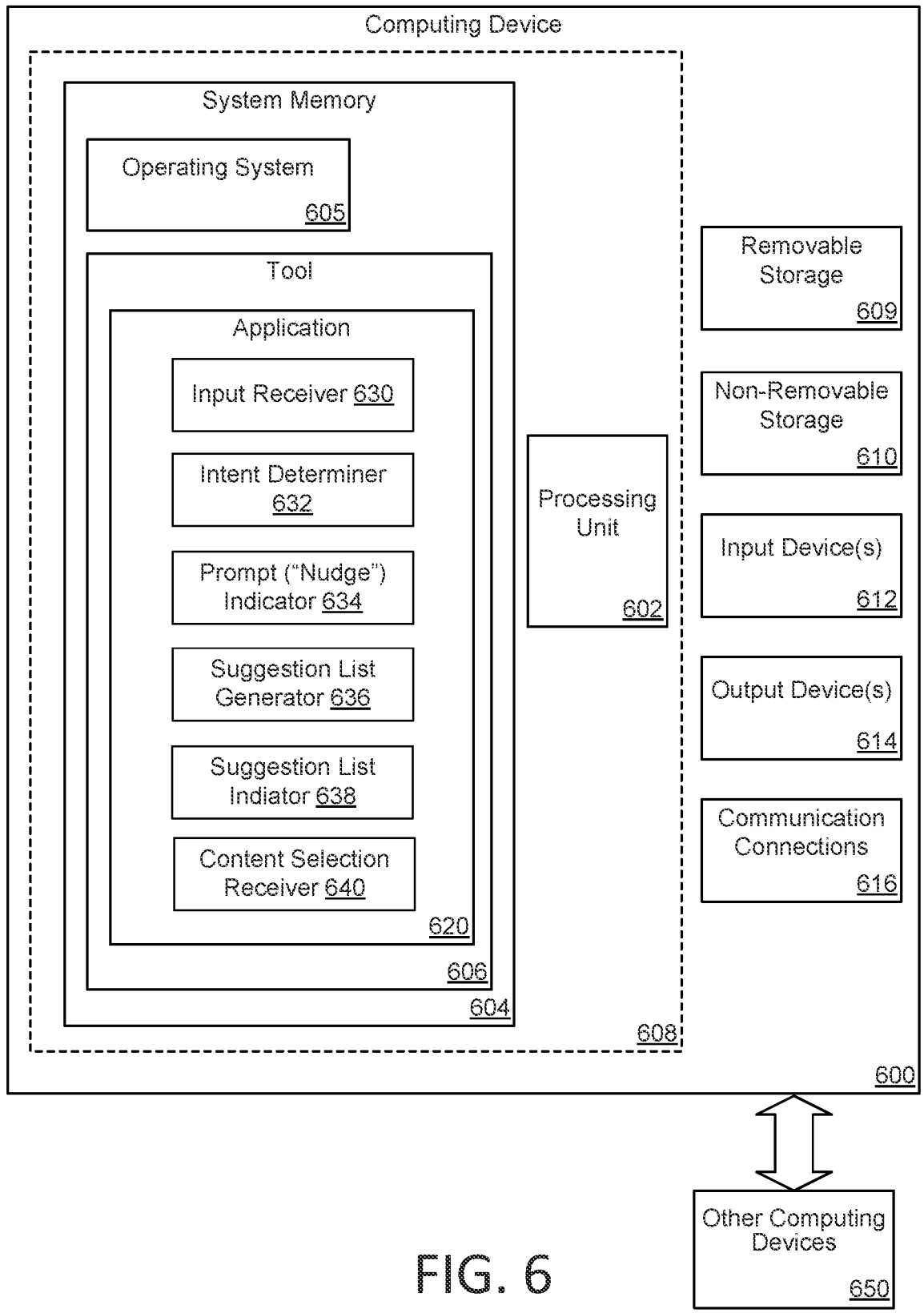
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes an input receiver 630, an intent determiner 632, a prompt ("nudge") presenter 634, a suggestion list generator 636, a suggestion list indicator 638, and a content selection receiver 640, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
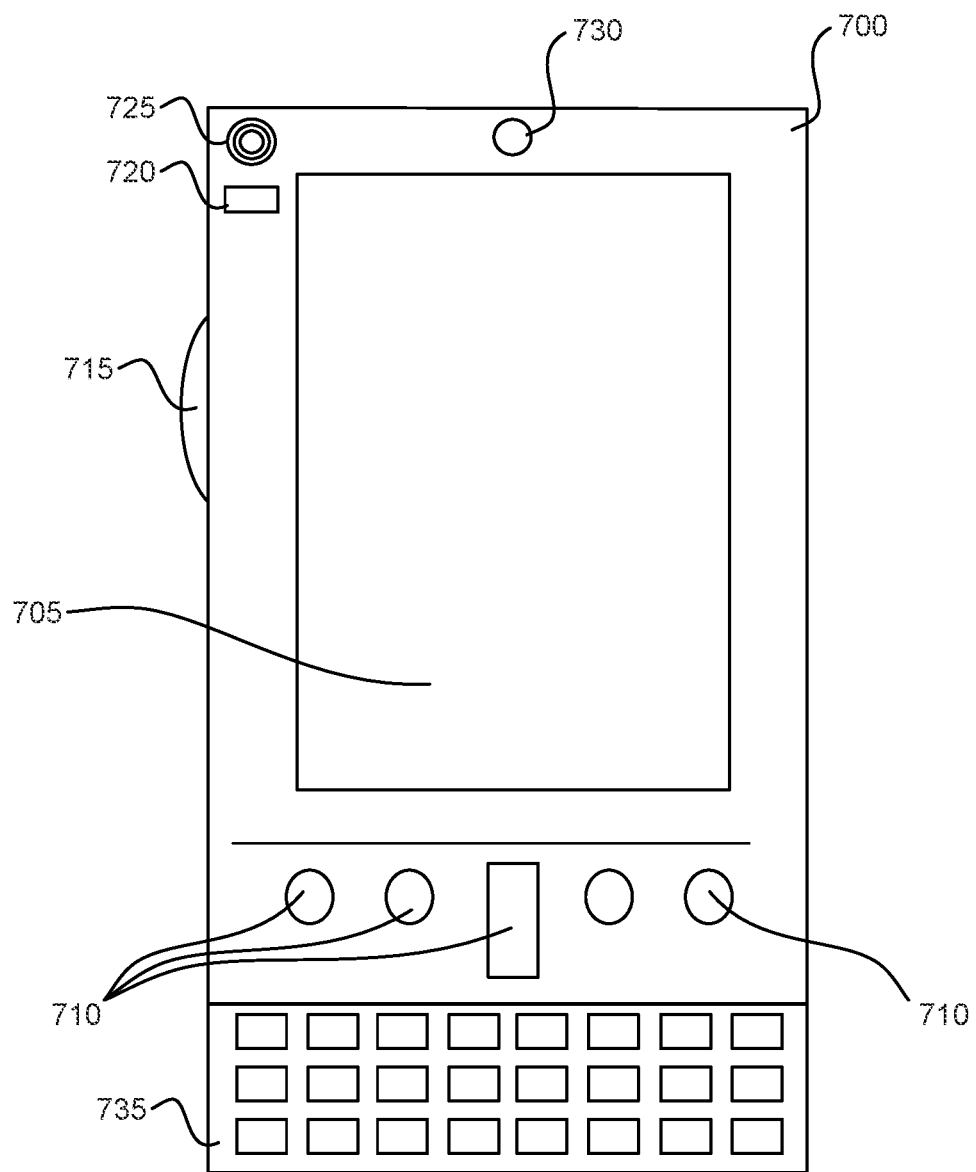
FIG. 7A is a simplified diagram of a mobile computing device with which aspects of the present disclosure may be practiced.
Figure 7B:
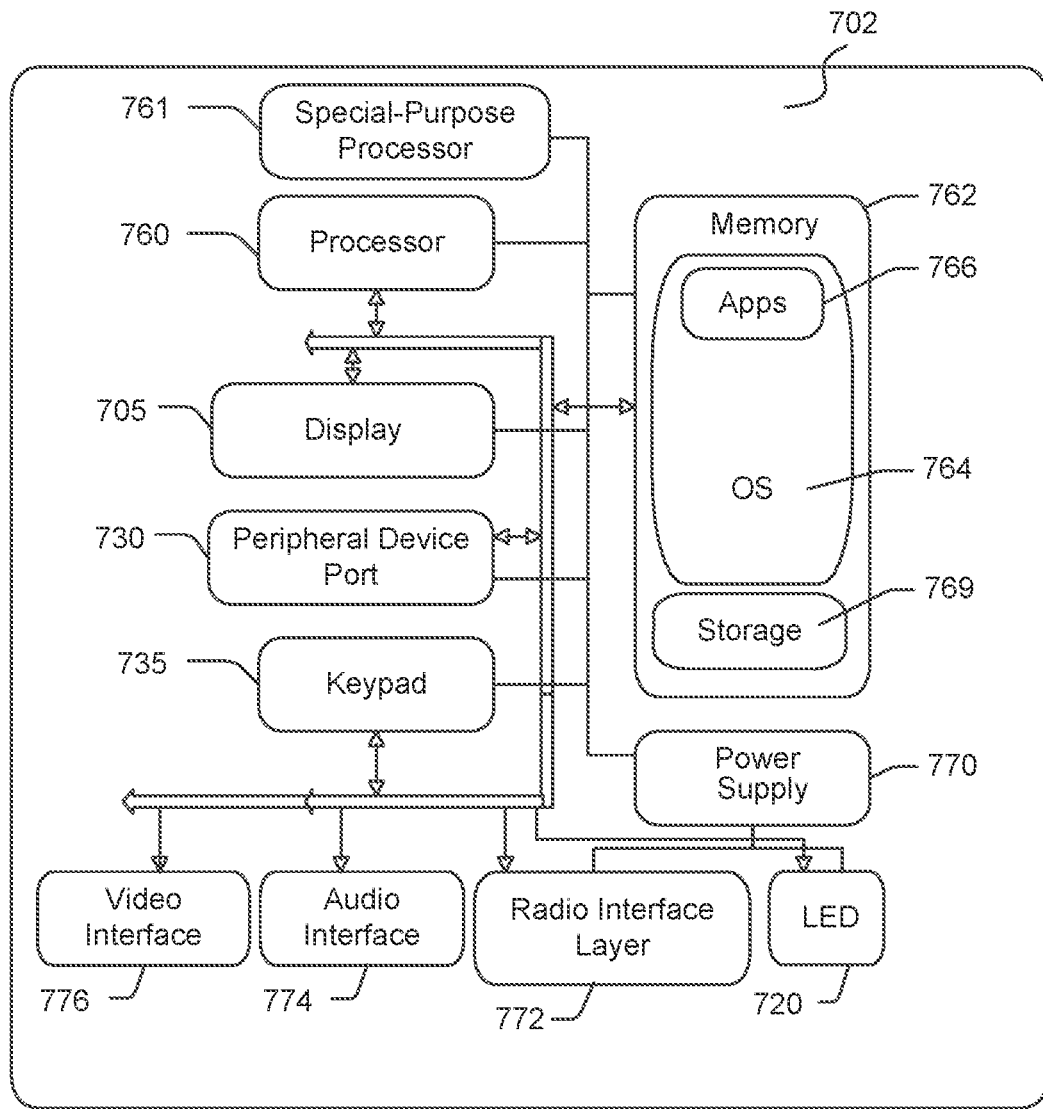
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., a user of the client device 102 as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., an intent-based augmenter (server) 106 and a third-party application server 106 as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining an intent and generating an inline search menu while a user in an input loop according to at least the examples provided in the sections below. As will be understood from the foregoing disclosure, one aspect of the technology relates to a computer-implemented method. The method comprises receiving text input for authoring a document; automatically determining, based on the text input, a likelihood of a user intent to attach an entity to the document using a trained intent model, wherein the trained intent model estimates, from a vectorized form of the text input, the user intent to attach the entity; causing display of, based on the likelihood of the user intent to attach content, a prompt; retrieving, based on a scope of an inline search according to the user intent, a set of entities; ranking respective entities in the set of entities according to a degree of relevance of the respective entities to the user intent; generating a suggestion list of ranked entities for attachment to the document; interactively displaying the suggestion list of ranked entities; receiving a selection of one or more entities in the suggestion list of ranked entities; and causing attachment of the one or more entities in the document. The user intent to attach an entity includes an intent to attach a file, and wherein the trained intent model includes an embeddings model based on the text input and a task model that associates the set of entities with the user intent for generating the suggestion list of ranked entities to attach the file to the document. The intent model includes an embeddings model and an N-gram model in parallel to determine a third-party application when content used by the third-party application excludes strongly typed entities. The intent model generates an intent score for determining a third-party application that maintains content associated with the user intent to attach the entity. The generating the list of ranked entities precedes the interactively receiving the predetermined character. The method further comprises causing display of the prompt substantially in proximity to a cursor for text entry without overlapping the cursor; and interactively receiving a response to the prompt. The method further comprises determining the user intent using a prefilter, wherein the prefilter compares one or more words in the text input with a whitelist, and wherein the whitelist includes the one or more words for determining whether to process the text input to determine the user intent to attach the entity. The method further comprises retrieving, based on the scope of the inline search according to the user intent to attach the entity, the set of entities using a graph entity model. The method further comprises discontinuing the displaying of the prompt upon displaying the suggestion list of ranked entities for attachment. The entities include one of: a file, a universal resource locator (URL), a link to the file, or data representing content.

Another aspect of the technology relates to a system for automatically generating a suggestion list of ranked entities based on an intent. The system comprises a processor; and a memory storing computer-executable instructions that when executed by the processor cause the system to execute a method comprising receiving text input for authoring a document; automatically determining, based on the text input, a user intent to attach an entity to the document using a trained intent model, wherein the trained intent model estimates the user intent to attach an entity from embeddings of the text input; causing display of, based on the user intent to attach an entity, a prompt including a predetermined character; retrieving, based on a scope of an inline search according to the user intent, a set of entities; ranking respective entities in the set of entities according to a degree of relevance of the respective entities to the user intent; generating the suggestion list of ranked entities for attachment to the document; interactively receiving the predetermined character; interactively displaying the suggestion list of ranked entities; receiving a selection of one or more entities in the suggestion list of ranked entities; and causing attachment of the one or more entities in the document. The entity includes a file, and wherein the trained intent model includes an embeddings model based on the text input and a task model associating the file and the user intent to attach the file to the document. The trained intent model includes an embedding model and an N-gram model in parallel to determine a third-party application when content used by the third-party application excludes strongly typed entities. The computer-executable instructions that when executed by the processor further cause the system to execute a method comprising, when no user input is received within a predetermined period of time, discontinuing the causing display of the prompt. The computer-executable instructions that when executed by the processor further cause the system to execute a method comprises displaying the prompt substantially in proximity to a cursor for text entry without overlapping the cursor. The computer-executable instructions that when executed by the processor further cause the system to execute a method comprises retrieving, based on the scope of the inline search according to the user intent, the set of files using a graph entity model.

In still further aspects, the technology relates to a computer-implemented method. The method comprises receiving text input for authoring a document; automatically determining, based on the text input, an entity type and a likelihood of a user intent to attach an entity of the entity type to the document using an intent model; when the determined entity type corresponds to a predetermined entity type, displaying, based on the likelihood of the user intent to attach content, a nudge, wherein the nudge indicates a status of the user intent to attach the content and a predetermined character; retrieving, based on a scope of an inline search according to the user intent to attach the content, a set of entities of the determined entity type using an entity model; ranking respective entities in the set of entities according to a degree of relevance of the user intent to attach the content; generating a suggestion list of ranked entities for attachment to the document; display the suggestion list of ranked entities subsequent to interactively receiving the predetermined character; interactively receiving a selection one or more entities in the suggestion list of ranked entities; and causing attaching the one or more entities to the document. The intent model includes either a combination of an embeddings model and the entity model, or an embedding model and an N-gram model in parallel to determine a third-party application when content used by the third-party application excludes strongly typed entities. The predetermined entity type is file, and wherein the entity corresponds to a file entity type. The method further comprises determining the user intent using a prefilter, wherein the prefilter compares one or more words in the text input with a whitelist, and wherein the whitelist includes the one or more words for determining whether to process the text input to determine the user intent to attach the entity.

Any of the one or more above aspects in combination with any other of the one or more aspect. Any of the one or more aspects as described herein.

What is claimed is:

1. A computer-implemented method, the method comprising:
    receiving text input for authoring a document;
    automatically determining, based on the text input, a likelihood of a user intent to attach an entity to the document using a trained intent model, wherein the trained intent model estimates, from a vectorized form of the text input, the user intent to attach the entity;
    causing display of, based on the likelihood of the user intent to attach content, a transient inline prompt at a location following the received text input for a predetermined time, the prompt comprising a predetermined character;
    retrieving, based on a scope of an inline search according to the user intent, a set of entities;
    ranking respective entities in the set of entities according to a degree of relevance of the respective entities to the user intent;
    generating a suggestion list of ranked entities for attachment to the document;
    interactively displaying, in response to interactively receiving the predetermined character, the suggestion list of ranked entities;
    receiving a selection of one or more entities in the suggestion list of ranked entities; and
    causing attachment of the selection of one or more entities in the document.

2. The computer-implemented method of claim 1, wherein the user intent to attach an entity includes an intent to attach a file, and wherein the trained intent model includes an embeddings model based on the text input and a task model that associates the set of entities with the user intent for generating the suggestion list of ranked entities to attach the file to the document.

3. The computer-implemented method of claim 1, wherein the trained intent model includes an embeddings model and an N-gram model in parallel to determine a third-party application when content used by the third-party application excludes strongly typed entities.

4. The computer-implemented method of claim 1, wherein the trained intent model generates an intent score for determining a third-party application that maintains content associated with the user intent to attach the entity.

5. The computer-implemented method of claim 1, wherein the generating the suggestion list of ranked entities precedes the interactively receiving a response to the prompt.

6. The computer-implemented method of claim 1, the method further comprising:
    causing display of the prompt substantially in proximity to a cursor for text entry without overlapping the cursor; and
    interactively receiving a response to the prompt.

7. The computer-implemented method of claim 1, the method further comprising:
    determining the user intent using a prefilter, wherein the prefilter compares one or more words in the text input with a whitelist, and wherein the whitelist includes the one or more words for determining whether to process the text input to determine the user intent to attach the entity.

8. The computer-implemented method of claim 1, the method further comprising:
    retrieving, based on the scope of the inline search according to the user intent to attach the entity, the set of entities using a graph entity model.

9. The computer-implemented method of claim 1, the method further comprising:
    discontinuing the displaying of the prompt upon displaying the suggestion list of ranked entities for attachment.

10. The computer-implemented method of claim 1, wherein the entities include one of:
    a file,
    a universal resource locator (URL),
    a link to the file, or
    data representing content.

11. A system for automatically generating a suggestion list of ranked entities based on a user intent, the system comprising:
    a processor; and
    a memory storing computer-executable instructions that when executed by the processor cause the system to execute a method comprising:
        receiving text input for authoring a document;
        automatically determining, based on the text input, the user intent to attach an entity to the document using a trained intent model, wherein the trained intent model estimates the user intent to attach an entity from embeddings of the text input;
        causing display of, based on the user intent to attach an entity, a transient inline prompt at a location following the received text input for a predetermined time, the prompt comprising a predetermined character;
        retrieving, based on a scope of an inline search according to the user intent, a set of entities;
        ranking respective entities in the set of entities according to a degree of relevance of the respective entities to the user intent;

generating the suggestion list of ranked entities for attachment to the document;
interactively receiving the predetermined character;
interactively displaying, in response to interactively receiving the predetermined character, the suggestion list of ranked entities;
receiving a selection of one or more entities in the suggestion list of ranked entities; and
causing attachment of the selection of one or more entities in the document.

12. The system of claim 11, wherein the entity includes a file, and
wherein the trained intent model includes an embeddings model based on the text input and a task model associating the file and the user intent to attach the file to the document.

13. The system of claim 11, wherein the trained intent model includes an embedding model and an N-gram model in parallel to determine a third-party application when content used by the third-party application excludes strongly typed entities.

14. The system of claim 11, the computer-executable instructions that when executed by the processor further cause the system to execute a method comprising:
when no user input is received within a predetermined period of time, discontinuing the causing the display of the prompt.

15. The system of claim 11, the computer-executable instructions that when executed by the processor further cause the system to execute a method comprising:
displaying the prompt substantially in proximity to a cursor for text entry without overlapping the cursor.

16. The system of claim 11, the computer-executable instructions that when executed by the processor further cause the system to execute a method comprising:
retrieving, based on the scope of the inline search according to the user intent, the set of files using a graph entity model.

17. A computer-implemented method, comprising:
receiving text input for authoring a document;
automatically determining, based on the text input, an entity type and a likelihood of a user intent to attach an entity of the entity type to the document using an intent model;
when the determined entity type corresponds to a predetermined entity type, displaying, based on the likelihood of the user intent to attach content, a nudge, at a location following the received text input for a predetermined time, the prompt comprising a predetermined character, wherein the nudge indicates a status of the user intent to attach the content and a predetermined character;
retrieving, based on a scope of an inline search according to the user intent to attach the content, a set of entities of the determined entity type using an entity model;
ranking respective entities in the set of entities according to a degree of relevance of the user intent to attach the content;
generating a suggestion list of ranked entities for attachment to the document;
display, in response to interactively receiving the predetermined character, the suggestion list of ranked entities subsequent to interactively receiving the predetermined character;
interactively receiving a selection of one or more entities in the suggestion list of ranked entities; and
causing attaching the one or more entities to the document.

18. The computer-implemented method of claim 17, wherein the intent model includes either a combination of an embeddings model and the entity model, or
an embedding model and an N-gram model in parallel to determine a third-party application when content used by the third-party application excludes strongly typed entities.

19. The computer-implemented method of claim 17, wherein the predetermined entity type is file, and wherein the entity corresponds to a file entity type.

20. The computer-implemented method of claim 17, the method further comprising:
determining the user intent using a prefilter, wherein the prefilter compares one or more words in the text input with a whitelist, and wherein the whitelist includes the one or more words for determining whether to process the text input to determine the user intent to attach the entity.

* * * * *